(12) United States Patent
Dyar

(10) Patent No.: US 9,932,064 B1
(45) Date of Patent: Apr. 3, 2018

(54) POWER STEERING SYSTEM

(71) Applicant: Royce Merrell Dyar, Oneonta, AL (US)

(72) Inventor: Royce Merrell Dyar, Oneonta, AL (US)

( * ) Notice: Subject to any disclaimer, the term of this patent is extended or adjusted under 35 U.S.C. 154(b) by 0 days.

(21) Appl. No.: 15/386,836

(22) Filed: Dec. 21, 2016

(51) Int. Cl.
*B62D 5/04* (2006.01)
*B62D 15/00* (2006.01)
*B62K 21/02* (2006.01)

(52) U.S. Cl.
CPC .............. *B62D 5/04* (2013.01); *B62D 15/00* (2013.01); *B62K 21/02* (2013.01)

(58) Field of Classification Search
CPC ...... B62D 5/04; B62D 5/0412; B62D 5/0409; B62D 5/0418; B62D 15/00; B62K 21/02; B62K 21/08; B62K 11/007; B62K 11/12
USPC ........ 180/443, 444, 446; 280/263, 270, 271, 280/272, 276
See application file for complete search history.

(56) References Cited

U.S. PATENT DOCUMENTS

| | | | | |
|---|---|---|---|---|
| 4,850,606 A * | 7/1989 | Weisgerber | .............. | B62D 3/02 180/444 |
| 6,105,983 A * | 8/2000 | Will | .......... | B62D 3/02 280/93.513 |
| 7,878,292 B2 * | 2/2011 | Hikichi | .................. | B62K 19/30 180/219 |
| 8,565,979 B2 * | 10/2013 | Linker | ..................... | B62J 27/00 180/223 |
| 8,606,464 B2 * | 12/2013 | Suzuki | ................... | B62K 21/00 180/219 |
| 8,620,525 B2 * | 12/2013 | Araki | ..................... | B62K 21/00 180/219 |
| 2001/0015539 A1 * | 8/2001 | Stewart | .................. | B62K 21/08 280/272 |
| 2005/0072621 A1 * | 4/2005 | Hara | ...................... | B62D 1/163 180/444 |
| 2005/0236791 A1 | 10/2005 | Carr | | |
| 2007/0007071 A1 * | 1/2007 | Aime | ....................... | B62D 5/04 180/444 |
| 2009/0139793 A1 * | 6/2009 | Suzuki | ................... | B62K 21/00 180/446 |
| 2011/0120797 A1 * | 5/2011 | Kitahata | ................. | B62D 5/04 180/443 |
| 2013/0066522 A1 * | 3/2013 | Haas | ....................... | B62J 27/00 701/41 |
| 2017/0088229 A1 * | 3/2017 | Mori | ........................ | B62D 5/04 |

* cited by examiner

*Primary Examiner* — Anne Marie M Boehler
(74) *Attorney, Agent, or Firm* — Dunlap Bennett & Ludwig PLLC

(57) ABSTRACT

A power steering system for a motorcycle is provided. The motorcycle includes a front fork having a first vertical bar and a second vertical bar. The power steering system include at least one motor. A first belt portion includes a first end secured to the first vertical bar and a second end operatively connected to the motor. A second belt portion includes a first end secured to the second vertical bar and a second end operatively connected to the motor. A power source is electrically connected to the motor by wiring through a switch. The switch includes a switch knob operable to activate the switch from an off position to a first mode and a second mode. The first mode includes the motor pulling the first belt portion and the second mode includes the motor pulling the second belt portion.

9 Claims, 3 Drawing Sheets

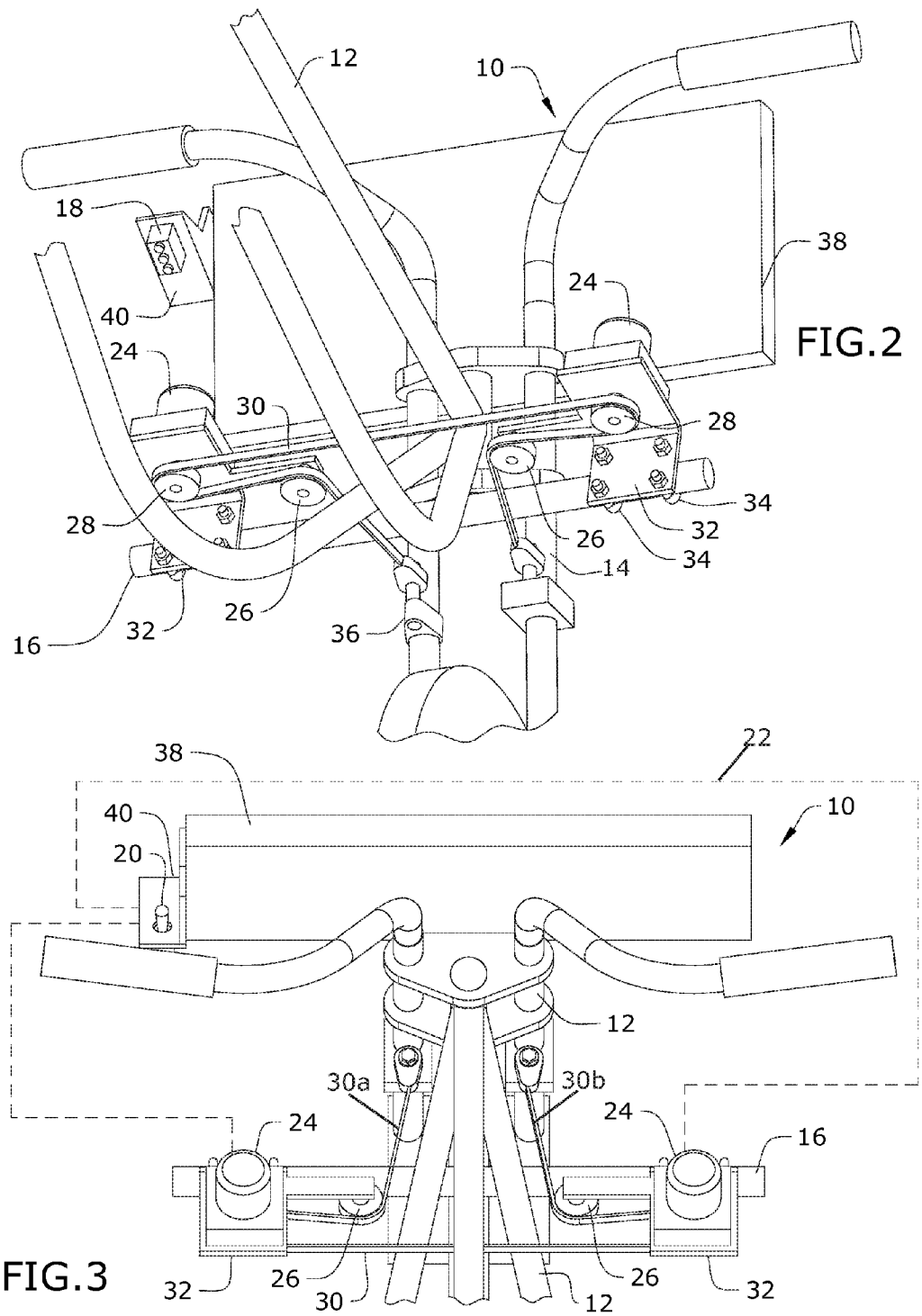

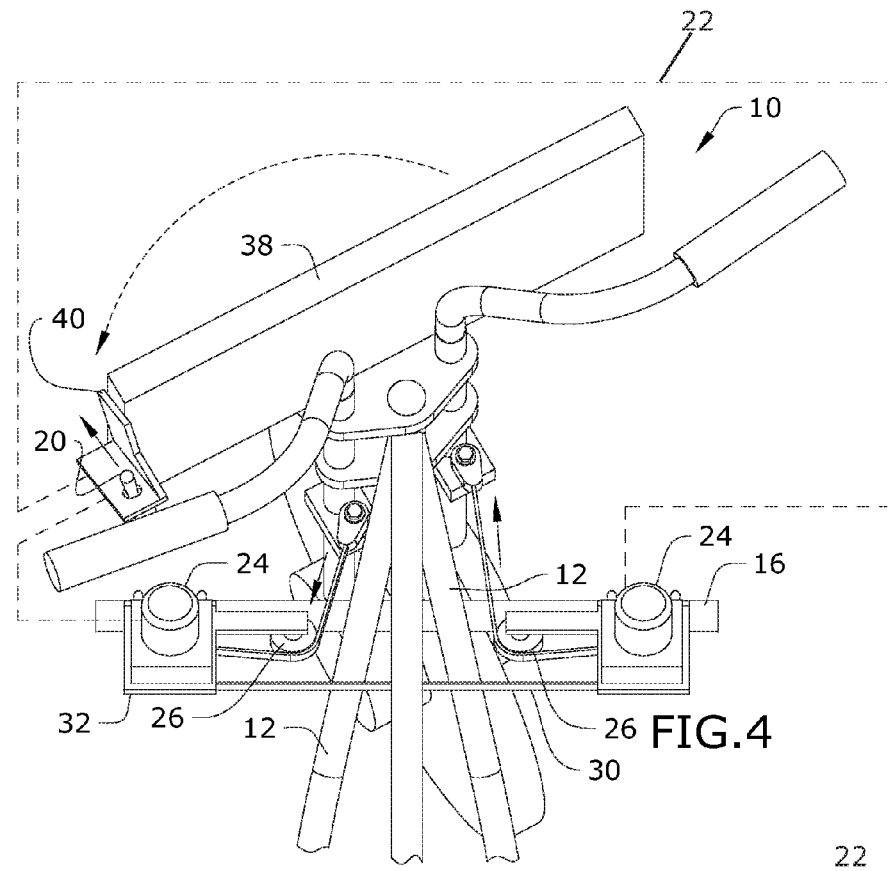
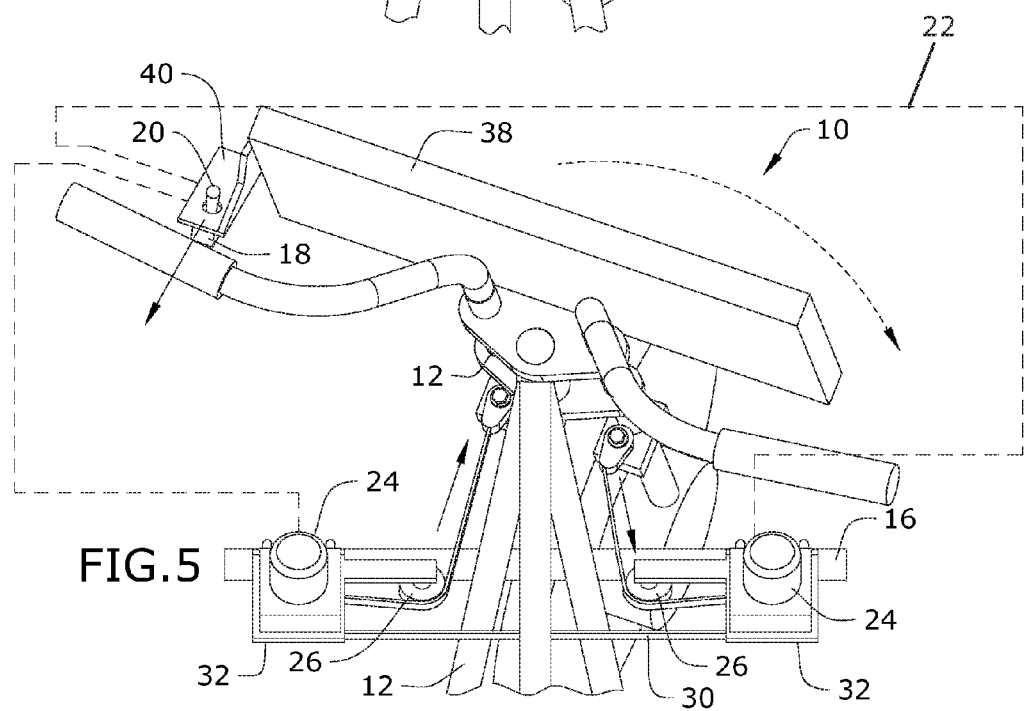

POWER STEERING SYSTEM

BACKGROUND OF THE INVENTION

The present invention relates to motorcycles and, more particularly, to a power steering system for motorcycles.

Current two wheel motorcycles all share a common set of parameters relevant to the handling underway. To steer these vehicles typically requires leaning of the body to cause direction change, and some input to the handlebars also assists steering. Although these forces are tolerable in a two wheel application, in a three wheel application these forces become dramatically more difficult because of a geometry change in a three wheel application.

As can be seen, there is a need for a power steering system for motorcycles.

SUMMARY OF THE INVENTION

In one aspect of the present invention, a motorcycle power steering system comprises: a front fork of a motorcycle comprising a first vertical bar and a second vertical bar; at least one motor; a first belt portion comprising a first end secured to the first vertical bar and a second end operatively connected to the at least one motor; a second belt portion comprising a first end secured to the second vertical bar and a second end operatively connected to that at least one motor; a power source operatively connected to the at least one motor; and a switch operable to direct power from the power source to the motor in a first mode and a second mode, wherein the first mode comprises the motor pulling the first belt portion and the second mode comprises the motor pulling the second belt portion.

In another aspect of the present invention, a power steering system comprises: a first motor operable to rotate a first motor pulley; a second motor operable to rotate a second motor pulley; a first tension idler pulley; a second tension idler pulley; a belt comprising a first end and a second end attachable to a steering component of a vehicle, wherein the belt runs around the first tension idler pulley, the first motor pulley, the second motor pulley and the second tension idler pulley; a power source operatively connected to the first motor and the second motor; and a switch operable to direct power from the power source to the first motor and the second motor in a first mode and a second mode, wherein the first mode comprises the first motor and the second motor rotating the first motor pulley and the second motor pulley in a first direction and the second mode comprises the first motor and the second motor rotating the first motor pulley and the second motor pulley in a second direction opposite of the first direction.

These and other features, aspects and advantages of the present invention will become better understood with reference to the following drawings, description and claims.

BRIEF DESCRIPTION OF THE DRAWINGS

FIG. 2 is a bottom perspective view of an embodiment of the present invention;

FIG. 3 is a top perspective view of an embodiment of the present invention illustrated without turning;

FIG. 4 is a top perspective view of an embodiment of the present invention illustrated turning left; and FIG. 5 is a top perspective view of an embodiment of the present invention illustrated turning right.

DETAILED DESCRIPTION OF THE INVENTION

Figure 1:
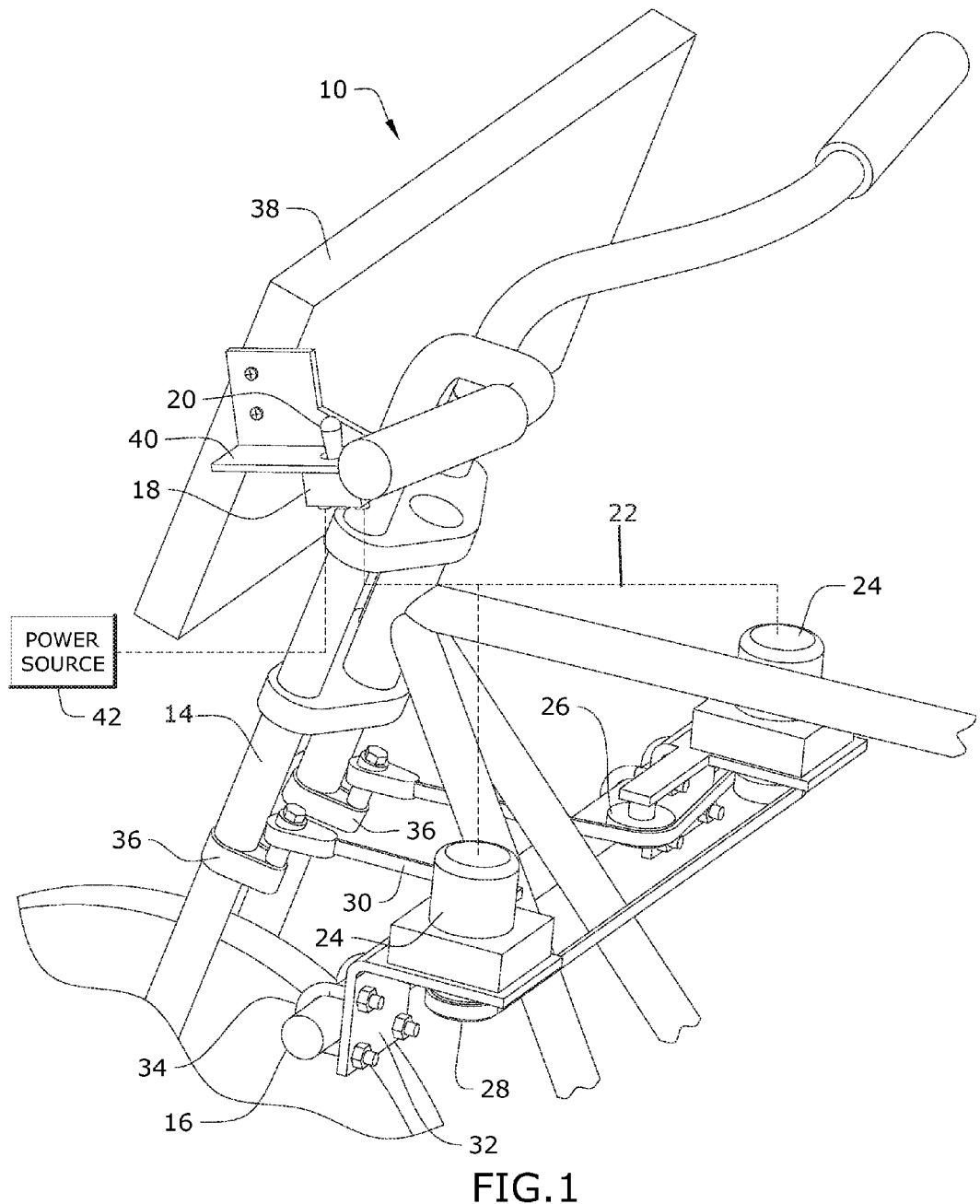
FIG. 1 is a perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a power steering system for a vehicle, such as a two, three or four wheeled motorcycle. The power steering of the present invention includes a motor, pulleys and belt connected to the steering component of the vehicle which activates via a switch when pushing or pulling on handlebars.

When coming up on curve to the right, and the power steering is set up on left side, the user pushes the left handle bar ever so slightly and it activates the switch to the on position. This turns the motors on to turn the belt that is attached to the front forks of the motorcycle. As the user is coming out of the curve, the user pulls back ever so slightly to activate the motors in the opposite direction. Once the user is out of the curve and going straight again, the switch automatically returns to center off position.

Referring to FIGS. 1 through 5, the present invention includes a power steering system for a vehicle 10, such as a motorcycle. The motorcycle includes a front fork 14 having a first vertical bar and a second vertical bar. The power steering system include at least one motor 24. A first belt portion 30a includes a first end secured to the first vertical bar and a second end operatively connected to the motor 24. A second belt portion 30b includes a first end secured to the second vertical bar and a second end operatively connected to the motor 24. A power source 42 is electrically connected to the motor 24 by wiring 22 through a switch 18. The switch 18 includes a switch knob 20 operable to activate the switch 18 from an off position to a first mode and a second mode. The first mode includes the motor 24 pulling the first belt portion 30a to aid a user turning left and the second mode includes the motor 24 pulling the second belt portion 30b to aid a user turning right.

In certain embodiments, the present invention may include at least one motor pulley 28 rotatable by the motor 24. In such embodiments, the first and second belt portions 30a, 30b are two portions of the same belt 30. The belt 30 may be a rubber v-belt. The belt 30 is wrapped around the motor pulley 28. In such embodiments, the first mode includes the motor 24 rotating the motor pulley 28 in a first direction and the second mode includes the motor 24 rotating the motor pulley 28 in a second direction opposite of the first direction. For example, when the motor 24 is rotated counterclockwise, the first belt portion 30a is pulled to aid a user turning left and when the motor 24 is rotated clockwise, the second belt portion 30b is pulled to aid a user turning right.

In certain embodiments, the at least one motor 24 and the at least one motor pulley 26 may include a first motor 24 rotating a first motor pulley 26 and a second motor 24 rotating a second motor pulley 26. The present invention may further include a first tension idler pulley 26 and a second tension idler pulley 26. In such embodiments, the belt 30 runs from the first vertical bar, wraps around the first tension idler pulley 26, wraps around the first motor pulley 24, wraps around the second motor pulley 24, wraps around the second tension idler pulley 26, and attaches to the second vertical bar.

The power steering system of the present invention may be secured to the vehicle 10 by brackets. The ends of the first and second belt portions 30a, 30b may be attached to the front fork 14 by belt attachment brackets 36. The motors 24 may be secured to motor brackets 32 and the motor brackets 32 may be secured to opposing ends of a tube attachment 16 by U bolts 34. The motor brackets 32 may be co-planar, supporting the motors 24 and pulleys 26, 28 at an even height. The tube attachment 16 may be secured to the vehicle frame 12. A dashboard plate 38 may be secured in front of the handlebars of the vehicle 10. A switch bracket 40 may support the switch 18 and the switch knob 20. The switch bracket 40 is secured to the dashboard plate 38. The switch knob 20 may be disposed on the right or left side of the handle bars.

In use, the switch knob 20 may be disposed in a central location while the user is driving straight. When the user is turning left, the user may press the switch knob 20 forward, which activates the motors 24 to turn the motor pulleys 28 counterclockwise, thereby pulling the left vertical bar of the fork 14 and turning the vehicle 10 left. When the user is turning right, the user may press the switch knob 20 rearward, which activates the motors 24 to turn the motor pulleys 28 clockwise, thereby pulling the right vertical bar of the fork 14 and turning the vehicle 10 right.

It should be understood, of course, that the foregoing relates to exemplary embodiments of the invention and that modifications may be made without departing from the spirit and scope of the invention as set forth in the following claims.

What is claimed is:

1. A motorcycle power steering system comprising:
   a front fork of a motorcycle comprising a first vertical bar and a second vertical bar;
   at least one motor;
      a first belt portion comprising a first end secured to the first vertical bar and a second end operatively connected to the at least one motor;
   a second belt portion comprising a first end secured to the second vertical bar and a second end operatively connected to that at least one motor;
   a power source operatively connected to the at least one motor;
      a switch operable to direct power from the power source to the motor in a first mode and a second mode, wherein
   the first mode comprises the motor pulling the first belt portion and the second mode comprises the motor pulling the second belt portion; and
   a switch bracket securing the switch to the motorcycle adjacent to handlebars.

2. The motorcycle power steering system of claim 1, further comprising at least one motor pulley rotatable by the motor.

3. The motorcycle power steering system of claim 2, wherein the first belt portion and the second belt portion are portions of a belt, wherein the belt is wrapped around the motor pulley.

4. The motorcycle power steering system of claim 3, wherein the first mode comprises the motor rotating the motor pulley in a first direction and the second mode comprises the motor rotating the motor pulley in a second direction opposite of the first direction.

5. The motorcycle power steering system of claim 3, wherein the at least one motor and the at least one motor pulley comprises a first motor rotating a first motor pulley and a second motor rotating a second motor pulley.

6. The motorcycle power steering system of claim 5, further comprising a first tension idler pulley and a second tension idler pulley.

7. The motorcycle power steering system of claim 6, wherein the belt runs from the first vertical bar, wraps around the first tension idler pulley, wraps around the first motor pulley, wraps around the second motor pulley, wraps around the second tension idler pulley and attaches to the second vertical bar.

8. The motorcycle power steering system of claim 1, further comprising a mounting bracket securing the at least one motor to a frame of the motorcycle.

9. A power steering system comprising:
   a first motor operable to rotate a first motor pulley;
   a second motor operable to rotate a second motor pulley;
   a first tension idler pulley;
   a second tension idler pulley;
   a belt comprising a first end and a second end attachable to a steering component of a vehicle, wherein the belt runs around the first tension idler pulley, the first motor pulley, the second motor pulley and the second tension idler pulley;
   a power source operatively connected to the first motor and the second motor;
   a switch operable to direct power from the power source to the first motor and the second motor in a first mode and a second mode, wherein
   the first mode comprises the first motor and the second motor rotating the first motor pulley and the second motor pulley in a first direction and the second mode comprises the first motor and the second motor rotating the first motor pulley and the second motor pulley in a second direction opposite of the first direction; and
   a switch bracket configured to secure the switch to a motorcycle adjacent to handlebars of the motorcycle.

* * * * *